US012031349B2

(12) United States Patent
Huang

(10) Patent No.: US 12,031,349 B2
(45) Date of Patent: Jul. 9, 2024

(54) SPA POOL WITH BUILT-IN INFLATABLE SEAT

(71) Applicant: BESTWAY INFLATABLES & MATERIAL CORP., Shanghai (CN)

(72) Inventor: Shuiyong Huang, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 132 days.

(21) Appl. No.: 17/856,087

(22) Filed: Jul. 1, 2022

(65) Prior Publication Data

US 2023/0243172 A1 Aug. 3, 2023

(30) Foreign Application Priority Data

Jan. 29, 2022 (CN) ........................ 202220241384.6

(51) Int. Cl.
*E04H 4/00* (2006.01)
*A61H 33/00* (2006.01)
(Continued)

(52) U.S. Cl.
CPC ....... *E04H 4/0025* (2013.01); *A61H 33/0087* (2013.01); *A61H 33/02* (2013.01); *E04H 4/14* (2013.01); *A61H 2201/0103* (2013.01)

(58) Field of Classification Search
CPC ..... E04H 4/0025; E04H 4/14; A61H 33/0087; A61H 33/02; A61H 2201/0103;
(Continued)

(56) References Cited

U.S. PATENT DOCUMENTS 4,019,210 A * 4/1977 Patterson ........... A61H 33/0087 4/492
4,110,852 A * 9/1978 Kline ................. A61H 33/0087 4/492

(Continued)

FOREIGN PATENT DOCUMENTS

CN 2832129 11/2006
CN 214996405 U * 12/2021 ............. A61H 33/00

(Continued)

OTHER PUBLICATIONS

Partial European Search Report dated Dec. 19, 2022 (Dec. 19, 2022) issued on related European patent application 22183562.2 by the European Patent Office.

*Primary Examiner* — Lori L Baker
(74) *Attorney, Agent, or Firm* — DICKINSON WRIGHT PLLC

(57) ABSTRACT

A spa pool is provided including a pool body, the pool body including a pool bottom and a pool wall together defining a water cavity. The spa pool further includes: an inflatable seat defining therein a second air chamber and disposed in the water cavity; a first nozzle assembly, wherein at least a part of the first nozzle assembly is accommodated within the inflatable seat, and a first end of the first nozzle assembly is in fluid communication with the water cavity. The pool body further includes a fluid pipeline disposed in the first air chamber, the fluid pipeline being in fluid communication with a second end of the first nozzle assembly, so that the first nozzle assembly provides fluid communication between the water cavity and the fluid pipeline.

15 Claims, 8 Drawing Sheets

(51) Int. Cl.
*A61H 33/02* (2006.01)
*E04H 4/14* (2006.01)

(58) Field of Classification Search
CPC ........ A61H 33/6005; A61H 2033/0037; A61H 2201/1623; A61H 2201/1633; A61H 2201/164; A61H 2203/0437; A61H 2205/081; A61H 2205/106; A61H 2205/12; A61H 33/027; A61H 33/6021; A61H 33/025
USPC ..... 4/541.1, 538, 491, 493, 545, 668, 541.2, 4/541.3
See application file for complete search history.

(56) References Cited

U.S. PATENT DOCUMENTS

| | | | | | |
|---|---|---|---|---|---|
| 4,773,104 | A * | 9/1988 | Wang | A61H 33/6036 4/492 |
| 4,893,362 | A * | 1/1990 | Murphy | A61H 33/0087 4/585 |
| 5,172,433 | A * | 12/1992 | Lake | A61H 33/6063 4/541.4 |
| 5,418,984 | A * | 5/1995 | Livingston, Jr. | A61H 33/6073 601/154 |
| 5,920,923 | A * | 7/1999 | Jillette | A61H 19/34 4/541.3 |
| 5,987,663 | A * | 11/1999 | Ludlow | A61H 33/6063 4/541.1 |
| 6,611,969 | B2 * | 9/2003 | Collins | A61H 33/6063 4/541.1 |
| 2002/0029414 | A1 * | 3/2002 | Shun Lau | A61H 33/0087 4/541.1 |
| 2005/0235406 | A1 * | 10/2005 | August | A61H 33/0087 4/493 |
| 2007/0124855 | A1 * | 6/2007 | Lau | A61H 33/02 4/541.1 |
| 2012/0124732 | A1 * | 5/2012 | Lau | E04H 4/0025 4/492 |
| 2019/0085576 | A1 * | 3/2019 | Lin | E04H 4/0025 |

FOREIGN PATENT DOCUMENTS

| | | | | |
|---|---|---|---|---|
| EP | 1726283 A1 * | 11/2006 | A61H 33/0087 |
| WO | 2018201373 | 11/2018 | |
| WO | WO-2019148381 A1 * | 8/2019 | A61H 33/02 |

* cited by examiner

SPA POOL WITH BUILT-IN INFLATABLE SEAT

CROSS-REFERENCE TO RELATED APPLICATION

This Application claims priority from Chinese Application CN 202220241384.6 filed Jan. 29, 2022 in China, the disclosure of which is incorporated herein by reference in its entirety.

BACKGROUND

1. Field

Apparatuses and methods consistent with exemplary embodiments relate to a SPA pool with a built-in inflatable seat.

2. Description of the Related Art

SPA pools can be used to hold warm water or hot water in which users may soak. Existing products include an inflatable SPA pool with a massage function, which has an inflatable pool main body which constitutes a cavity body, and a massage nozzle assembled on an inner wall of the main body. The massage nozzle provides massage for users by spraying air or water.

According to the related art, an inflatable SPA pool can only massage the back and waist of a user because the massage nozzles are arranged on the inner wall of the inflatable pool main body. The user would need to adjust his position and posture in the pool so that his body, abutting the inner wall of the main body, can be massaged. Accordingly, a user may not be completely relaxed.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a spa pool comprises: a pool body comprising a pool bottom and a pool wall, together defining a water cavity, wherein the pool wall defines therein a first air chamber; an inflatable seat, defining therein a second air chamber, disposed in the water cavity; a first nozzle assembly, wherein at least a part of the first nozzle assembly is accommodated within the second air chamber, and a first end of the first nozzle assembly is in fluid communication with the water cavity; and a fluid pipeline disposed within the first air chamber, wherein the fluid pipeline is in fluid communication with a second end of the first nozzle assembly, such that the first nozzle assembly provides fluid communication between the water cavity and the fluid pipeline.

The inflatable seat may comprise at least one of an inflatable chair, an inflatable lounge chair, and an inflatable stool.

The inflatable seat may comprise a backrest, and the first nozzle assembly is disposed in the backrest.

The inflatable seat may further comprise: a bearing part, wherein the bearing part and the backrest jointly define the second air chamber, and a tensioning belt assembly connected to the backrest and the pool bottom.

The bearing part may be fixed to the pool bottom.

The spa pool may further comprise: a first wave-making unit disposed on the pool bottom and comprising a cavity therein and a plurality of holes therethrough such that the cavity in the first wave-making unit is in fluid communication with the water cavity through the plurality of holes in the first wave-making unit; and a second wave-making unit disposed on a surface of the inflatable seat and comprising a cavity therein and a plurality of holes therethrough such that the cavity in the second wave-making unit is in fluid communication with the water cavity through the plurality of holes in the second wave-making unit.

The first wave-making unit may comprise a wave-making channel disposed along a periphery of the inflatable seat.

The inflatable seat may comprise a leg support, and the second wave-making unit is disposed adjacent to the leg support.

The first wave-making unit may be in fluid communication with the second wave-making unit.

The fluid pipeline may comprise a water inlet pipeline disposed in the first air chamber; the SPA pool further comprises a connecting assembly comprising: a first connecting assembly disposed in the first air chamber and is in fluid communication with the first nozzle assembly.

The fluid pipeline may further comprise an air inlet pipeline comprising a first end connected to the first connecting assembly, and a second end disposed on the pool wall, wherein the air inlet pipeline provides fluid communication between the first connecting assembly and a space external to the spa pool.

The spa pool may further comprise: a second nozzle assembly comprising a first end in fluid communication with the water cavity; and a second connecting assembly disposed in the first air chamber and in fluid communication with a second end of the second nozzle assembly.

According to an aspect of another example embodiment, a spa pool comprises: a pool body defining a water cavity therewithin; an inflatable seat disposed in the water cavity, the inflatable seat defining an air chamber therein and comprising a nozzle assembly extending through the air chamber from a first end on a first side of the inflatable seat to a second end on a second side of the inflatable seat; a fluid pipeline disposed within the pool body; and a connecting assembly providing fluid communication between the second end of the nozzle assembly and the fluid pipeline.

The spa pool may further comprise: a second inflatable seat disposed in the water cavity, the second inflatable seat defining an air chamber therein and comprising a second nozzle assembly extending through the air chamber from a first end on a first side of the second inflatable seat to a second end on a second side of the second inflatable seat; and a second connecting assembly providing fluid communication between the second end of the second nozzle assembly and the fluid pipeline.

The spa pool may further comprise: a wave-making unit disposed in the water cavity and defining a cavity therein and a plurality of holes therethrough such that the cavity in the wave-making unit is in fluid communication with the water cavity through the plurality of holes in the wave-making unit.

The wave-making unit may be disposed on a surface of the inflatable seat.

The wave-making unit may be disposed on a bottom surface of the pool body.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
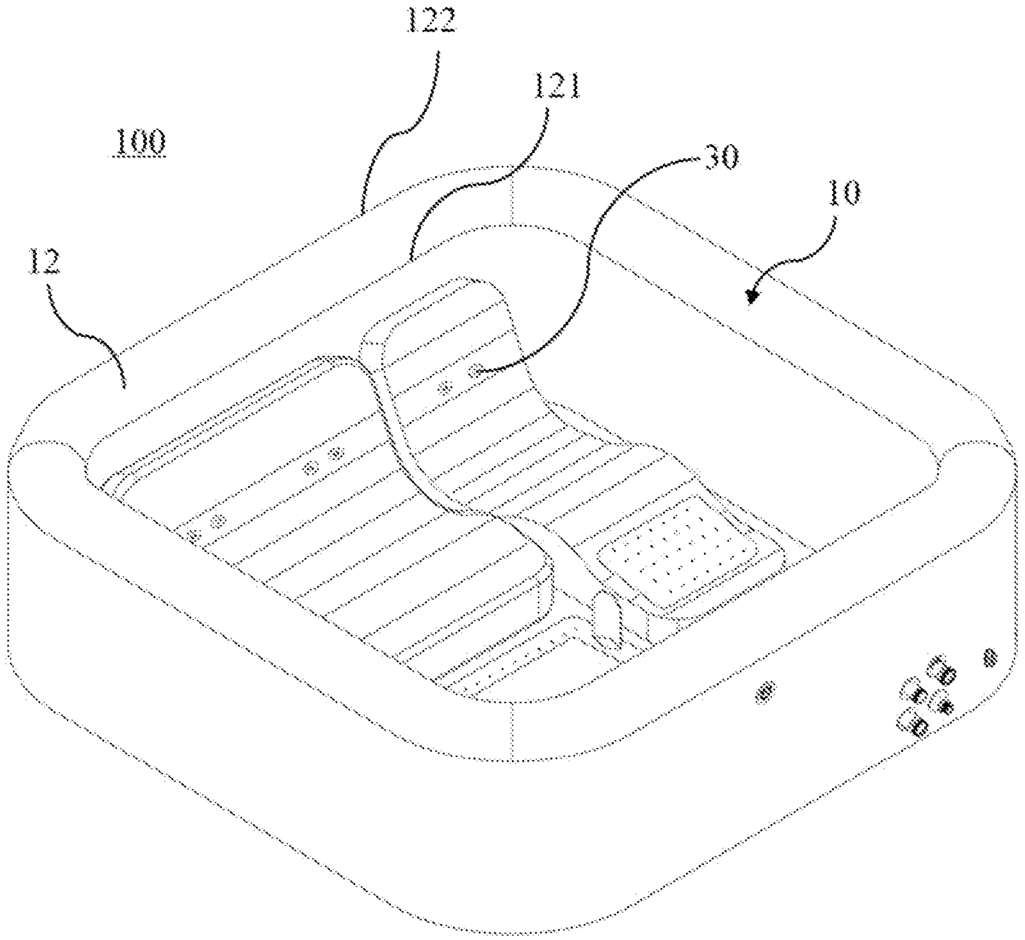
FIG. 1 shows a perspective schematic diagram of a SPA pool with an inflatable seat built in according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these exemplary embodiments pertain may not be described here in detail.

As described herein, the expressions of orientations such as "inner," "outer," etc., which are used for explaining the structural positions of various components, are not absolute but relative. The orientation expressions are appropriate when the various components are arranged as shown in the figures, but should change accordingly when the positions of the various components in the figures change.

FIG. 1 to FIG. 9 show an example embodiment of a SPA pool. The use of the terms "SPA" and "spa" may be interchangeable.

Figure 2:
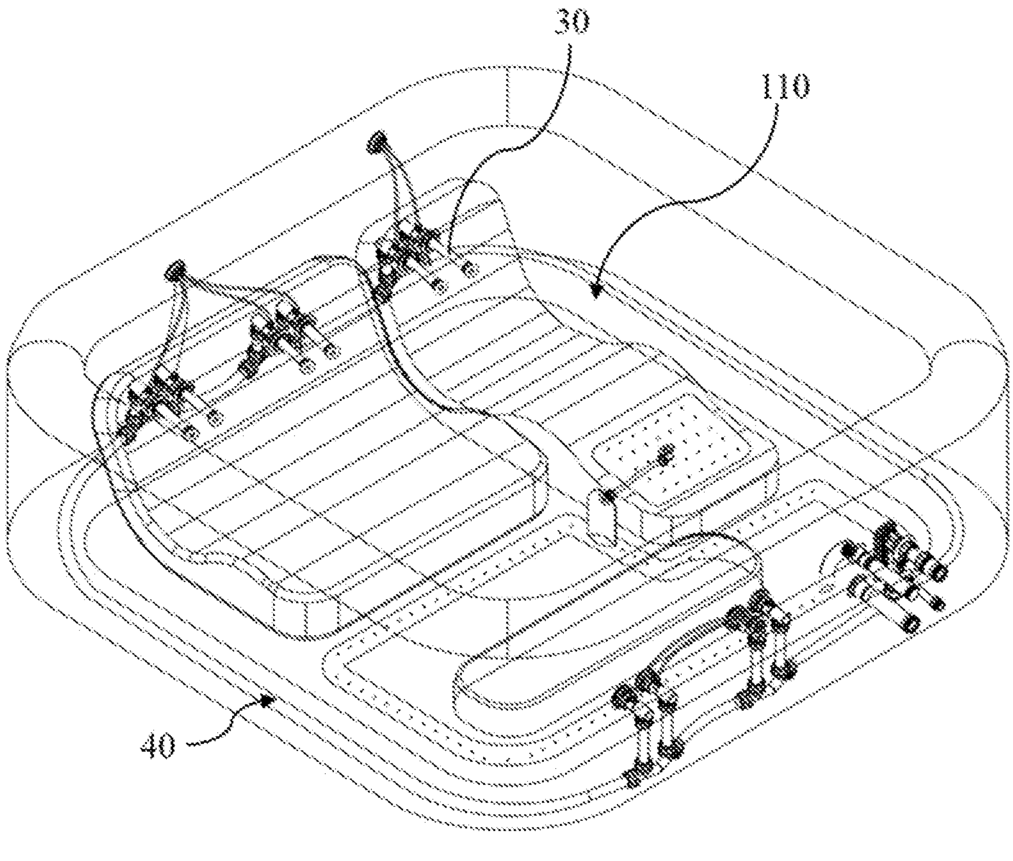
FIG. 2 shows a schematic diagram of the SPA pool of FIG. 1, with a pool wall shown in a transparent manner.
Figure 3:
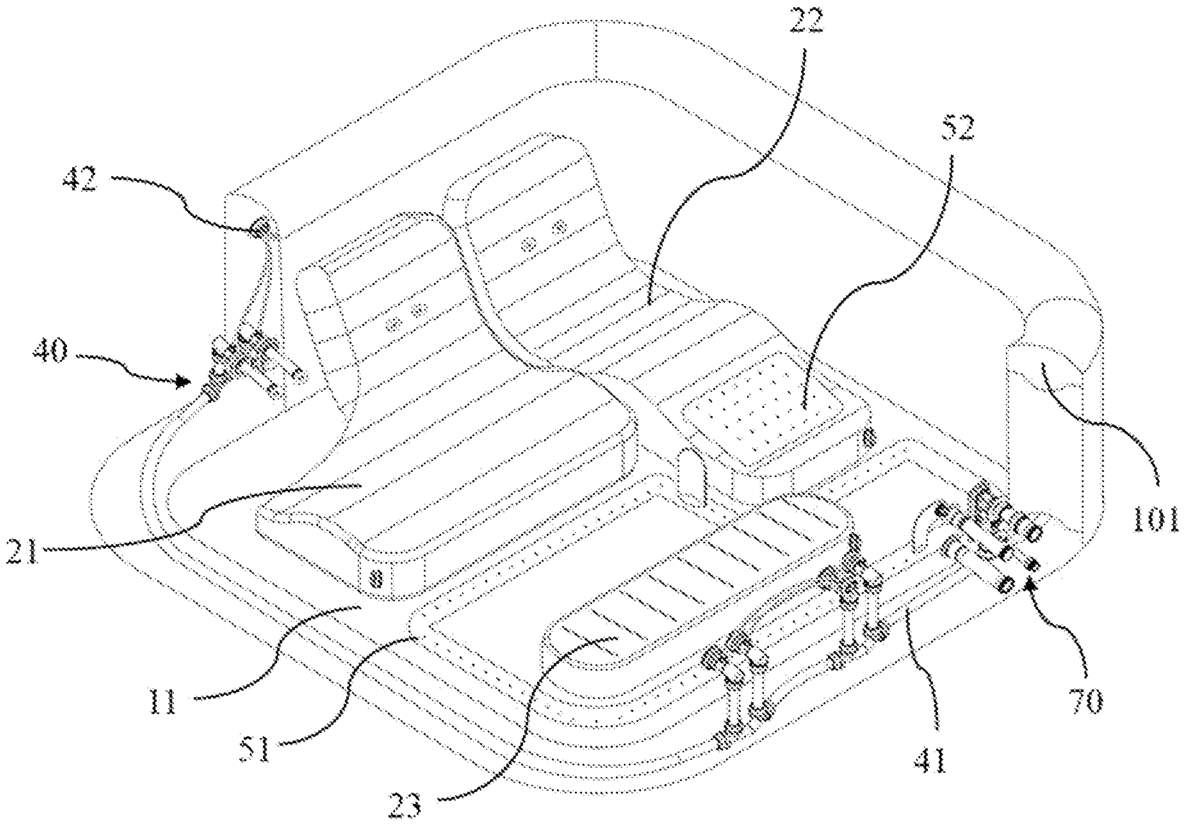
FIG. 3 shows a schematic diagram omitting a part of the pool wall of the SPA pool of FIG. 1.

FIGS. 1 and 2 respectively show a SPA pool 100 according to an example embodiment. The SPA pool 100 is inflatable and includes a pool body 10. With reference to FIG. 3, the pool body 10 includes a pool bottom 11 and a pool wall 12 with a first air chamber 101. The pool bottom 11 and the pool wall 12 define a water cavity 110. Specifically, the pool wall 12 includes an inner wall 121 and an outer wall 122, and the pool bottom 11 forms the bottom of the water cavity 110. Further, at least one inflatable seat including a second air chamber is arranged in the water cavity 110. According to the example embodiment shown in FIGS. 1 to 3, the at least one inflatable seat includes at least one of an inflatable seat chair 21, an inflatable lounge chair 22, and an inflatable stool 23. Optionally, the inflatable seat chair 21, the inflatable lounge chair 22, and the inflatable stool 23 can be used by a single person or by two or more people. Take the inflatable lounge chair 22 as an example. The inflatable lounge chair 22 has a second air chamber 102 (shown in FIG. 7). Optionally, the SPA pool may further include a nozzle assembly at least partially accommodated in the inflatable seat. Referring to FIG. 2 to FIG. 5, the SPA pool 100 includes several first nozzle assemblies 30, and these first nozzle assemblies 30 pass through the inflatable seat chair 21 and the inflatable lounge chair 22. One end of the first nozzle assembly 30 is in fluid communication with the water cavity 110, and the other end thereof is in fluid communication with a fluid pipeline 40 provided in the first air chamber 101, so that the water cavity 110 and the fluid pipeline 40 are in fluid communication through the first nozzle assembly 30. In an optional embodiment, the first nozzle assembly 30 may deliver water flow and/or air flow into the water cavity 110.

Figure 4:
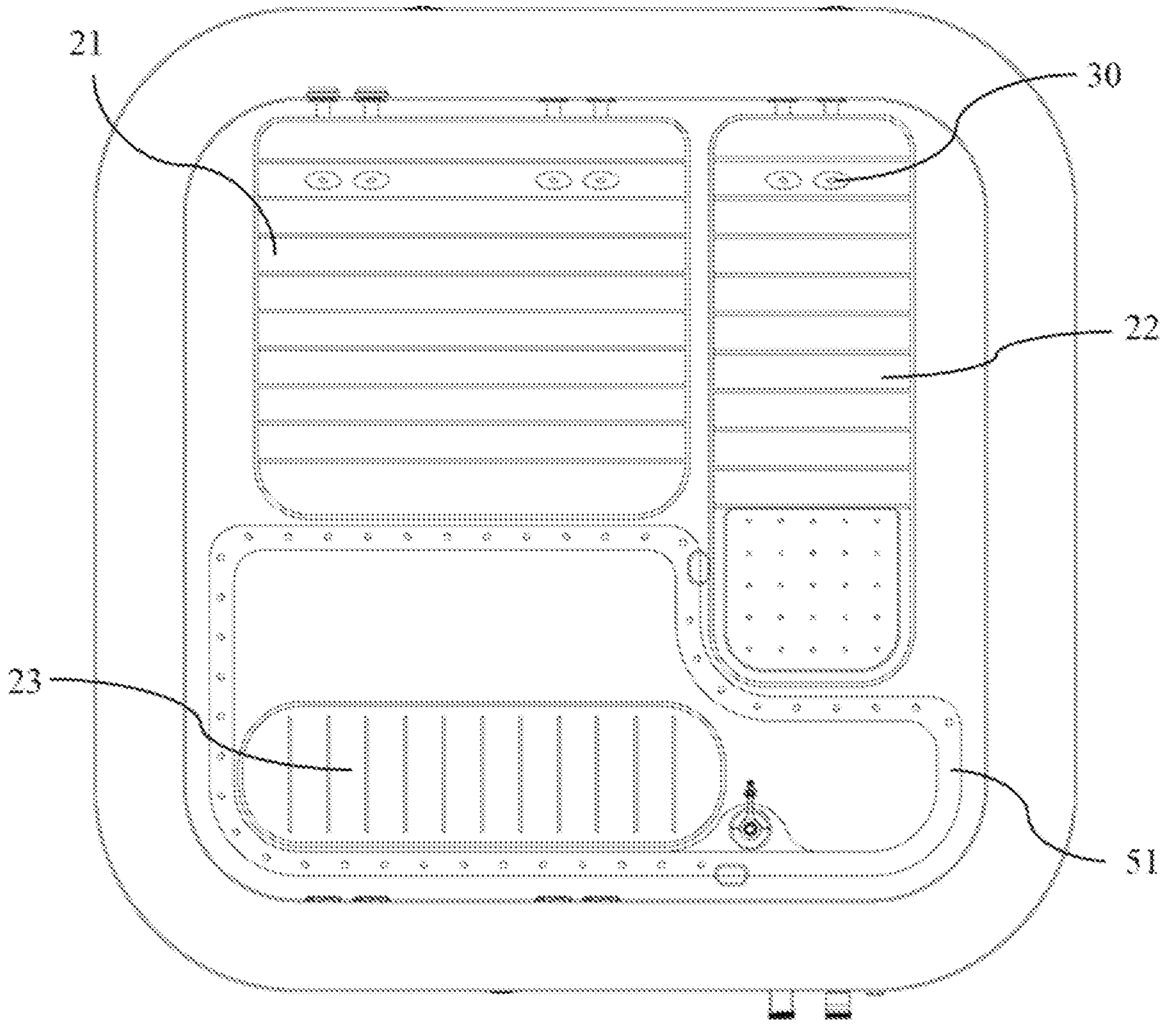
FIG. 4 shows a schematic top view of the SPA pool of FIG. 1.
Figure 5:
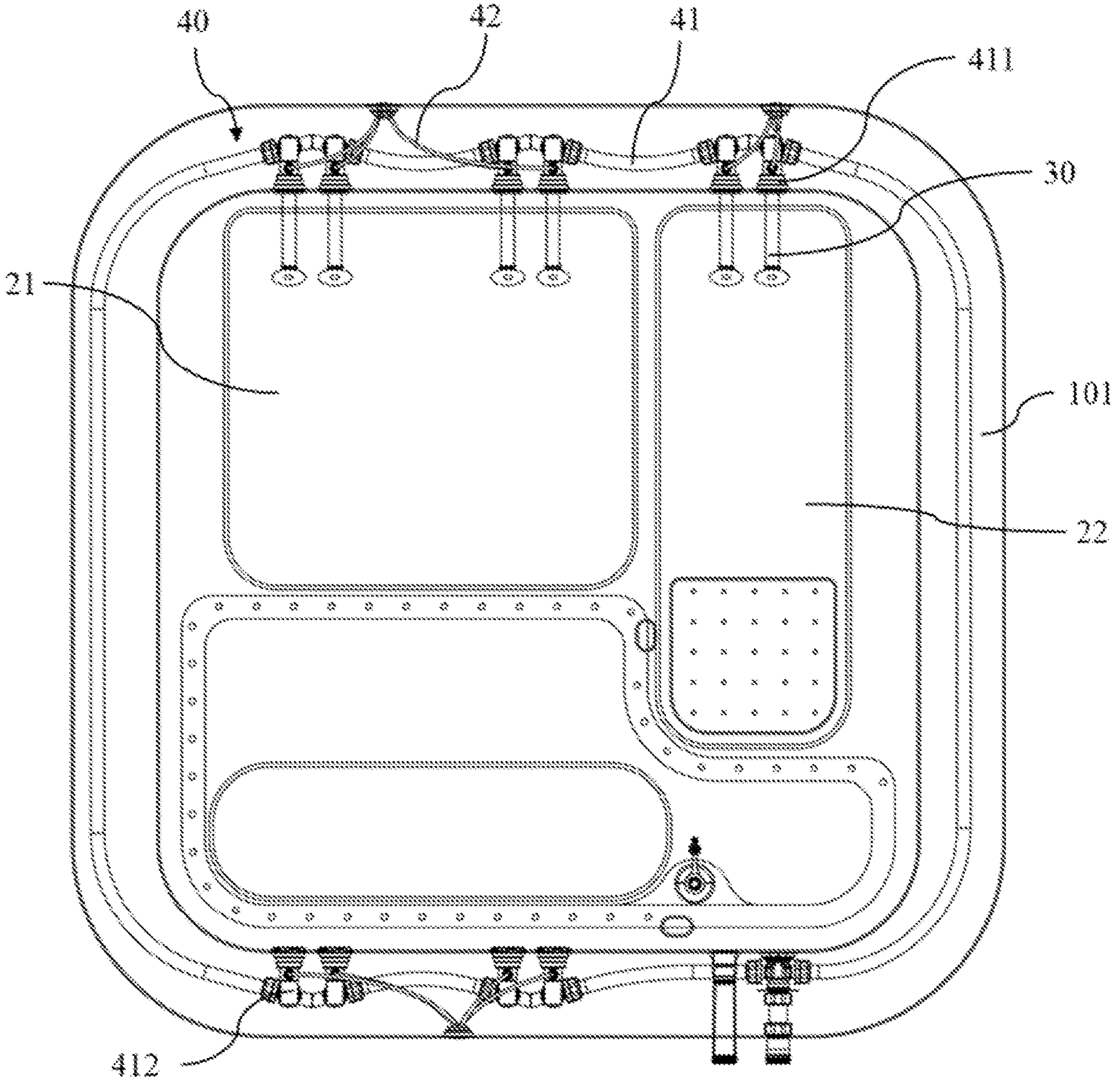
FIG. 5 is similar to FIG. 4, in which the pool wall and the seat are shown in a transparent manner.
Figure 6:
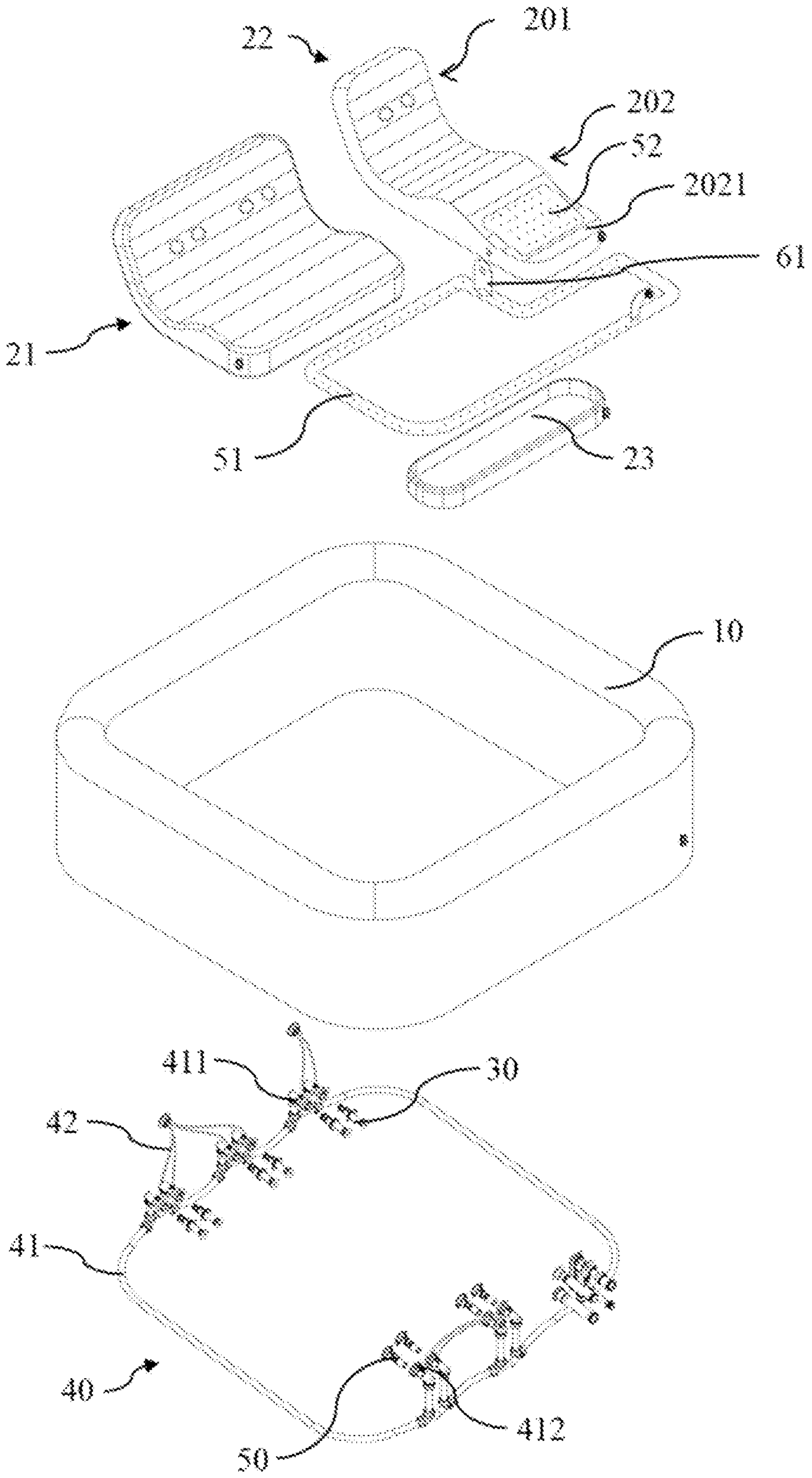
FIG. 6 shows an exploded schematic diagram of the SPA pool of FIG. 1.

With reference to the example shown in FIGS. 4 to 6, the inflatable seat chair 21, the inflatable lounge chair 22, and the inflatable stool 23 may be inflated independently, and the inflatable air chambers of the inflatable seat chair 21, the inflatable lounge chair 22, and the inflatable stool 23 are the second air chambers 102 which are independent from the first air chamber 101, that is, the first air chamber 101 and the second air chambers 102 are independent from each other. In this case, the pool body 10 and each inflatable seat (for example, the inflatable seat chair 21, the inflatable lounge chair 22, or the inflatable stool 23) may be inflated separately. In another optional embodiment, the first air chamber 101 is in fluid communication with each second air chamber 102, for example, the air chamber of the pool body 10 is in fluid communication with the air chamber of each inflatable seat (for example, the inflatable seat chair 21, the inflatable lounge chair 22, or the inflatable stool 23) through, for example, a pipe or a through hole, so as to enable simultaneous inflation of each inflatable seat when a user inflates the pool body 10.

The inflatable seat chair 21 optionally includes a backrest part and a bearing part, and the backrest part and the bearing part of the inflatable seat chair 21 together define a second air chamber of the inflatable seat chair 21. The inflatable lounge chair 22 optionally includes a backrest part 201 and a bearing part 202, as shown in FIG. 6, and, compared with the bearing part of the inflatable seat chair 21, the bearing part of the inflatable lounge chair 22 is further provided with a leg support 2021. The backrest part 201 and the bearing part 202 of the inflatable lounge chair 22 together define the second air chamber 102 of the inflatable lounge chair 22. At least one of the first nozzle assemblies 30 is arranged at the backrest part 201 to massage the back or waist of a user on the inflatable seat chair 21 or the inflatable lounge chair 22, and the user can lie down for a massage on the inflatable lounge chair 22.

The backrest part 201 of the inflatable lounge chair 22 may be provided with two first nozzle assemblies 30, and the bearing part 202 of the inflatable lounge chair 22 may form a cushion. Each first nozzle assembly 30 passes through the backrest part 201 and is connected to the fluid pipeline 40 behind the backrest part 201.

Figure 7:
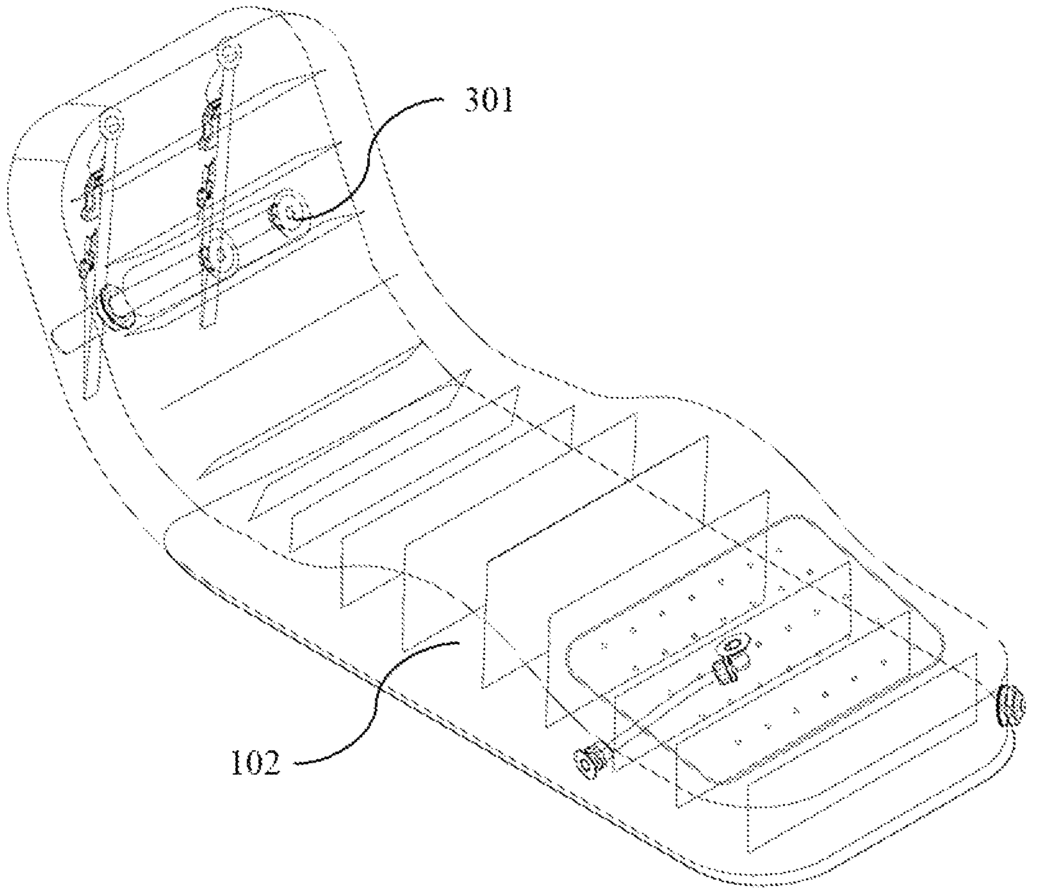
FIG. 7 shows a schematic diagram of the inflatable seat of an example embodiment in a transparent manner.
Figure 8:
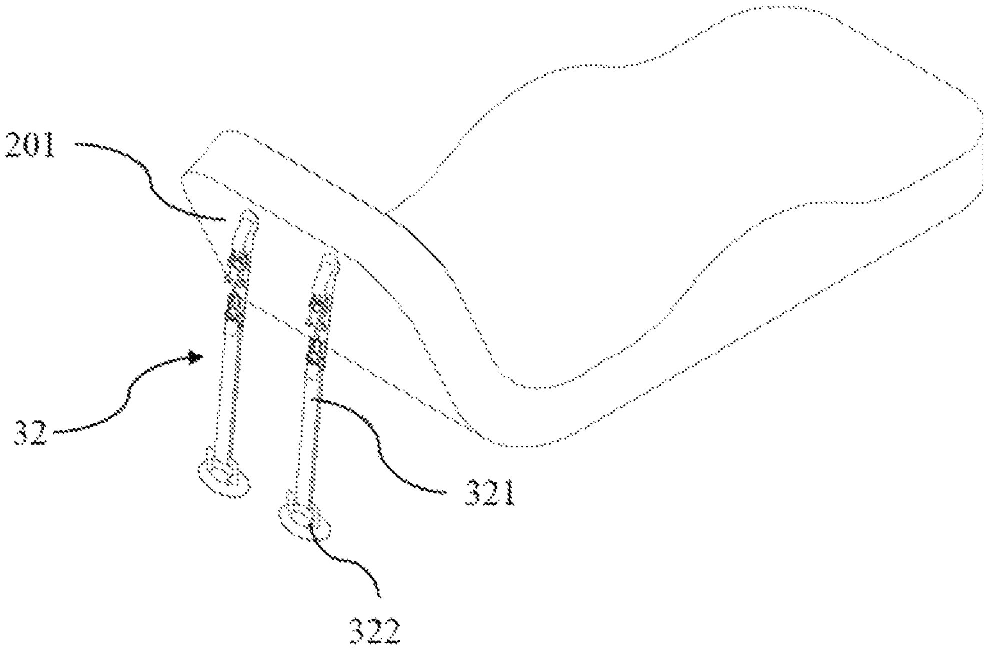
FIG. 8 shows a schematic diagram of the connection of a tensioning belt assembly.
Figure 9:
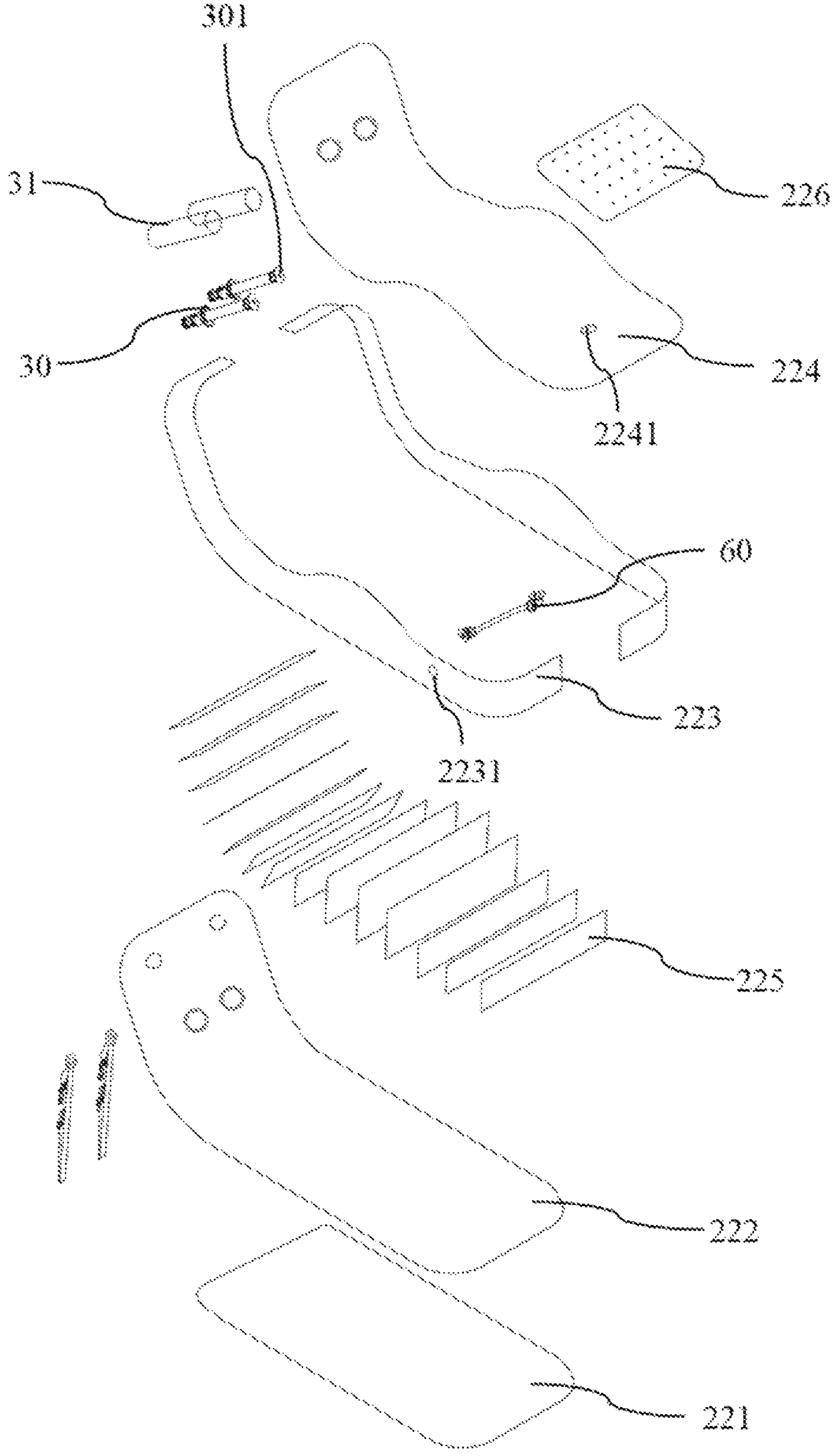
FIG. 9 shows an exploded schematic diagram of the inflatable seat example FIG. 7.

According to an aspect of one example embodiment, as illustrated in FIG. 9, the inflatable lounge chair 22 may include an attachment sheet 221, a bottom sheet 222, a confining sheet 223, and a top sheet 224. The bottom sheet 222, the confining sheet 223, and the top sheet 224 may be hermetically connected (for example, by welding or glue) to form the second air chamber 102 and integrally, to form the backrest part 201 and the bearing part 202. The attachment sheet 221 is connected to the pool bottom 11 of the pool body 10 and the bottom sheet 222, respectively, by glue or welding, so that the bearing part 202 fixed to the pool bottom 11, thereby fixing the inflatable lounge chair 22 to the pool bottom 11. The inflatable lounge chair 22 further includes internal tensioning members 225 connected to the bottom sheet 222, the top sheet 224, and optionally connected to the confining sheet 223. As shown in FIGS. 7 and 8, when the second air chamber 102 is inflated, the internal tensioning members 225 provide a tension forming the inflatable lounge chair 22 into a desired shape. Further referring to FIGS. 7 to 9, through holes, corresponding to the first nozzle assemblies 30, are formed on the bottom sheet 222 and the top sheet 224, and one or more first nozzle assemblies 30 are connected to the fluid pipeline 40 via the through holes. As shown in FIGS. 7 and 9, the first nozzle assembly 30 has a nozzle 301, and the nozzle 301 is connected to the pipe in the first nozzle assembly 30 and is attached to the through hole on the top sheet 224.

According to one or more example embodiments, as shown in FIG. 9, the first nozzle assembly 30 may be hermetically connected to the second air chamber 102 through a sleeve 31. Ends of the sleeve 31 may be hermetically connected to the bottom sheet 222 and the top sheet 224, respectively, and the first nozzle assembly 30 may extend through the sleeve 31.

The first nozzle assembly 30 may pass through the backrest part 201 and may be connected to the fluid pipeline 40 at the side of the backrest part 201. It should be understood that in this example, through holes corresponding to the first nozzle assembly 30 are formed on the confining sheet 223 and the top sheet 224. That is, the water flowing through the first nozzle assembly 30 (optionally the water being mixed with gas) flows into the first nozzle assembly 30 from the through hole formed in the confining sheet 223, and is ejected from the nozzle provided on the top sheet 224.

According to one or more example embodiments in which an inflatable seat does not include a backrest part, for example, for an inflatable stool 23, the first nozzle assembly may deliver water flow and/or air flow into the water cavity 110 from a seat surface of the inflatable stool, and the first nozzle assembly extends from the side of the inflatable stool to be connected to the fluid pipeline.

According to one or more example embodiments in which an inflatable seat does include a backrest part, taking the inflatable lounge chair 22 as an example, and referring to FIG. 8, the backrest part 201 may be connected to the pool bottom 11 via tensioning belt assemblies 32. Specifically, each tensioning belt assembly 32 includes a belt member 321 and a ring member 322. The belt member 321 includes a tensioning belt and male and female buckles arranged on the tensioning belt, the tensioning belt is fixed to the bottom sheet 222 of the inflatable lounge chair 22, the ring member 322 is fixed to the pool bottom 11, and the tensioning belt passes through the ring member 322 with the male and female buckles locked, such that the backrest part 201 is limited to a height at a certain distance from the pool bottom 11. In this way, when water is filled in the water cavity 110, the tensile force provided by the tensioning belt assembly 32 limits the deformation of the backrest part 201 under buoyancy, so as to provide a smoothness of the first nozzle assembly and its water supply pipe.

According to one or more example embodiments, the first nozzle assembly 30 may be fixed to the fluid pipeline 40 through a fixed-length pipe. As illustrated in FIGS. 5 and 6, the fluid pipeline 40 includes a water inlet pipeline 41, wherein the water inlet pipeline 41 may extend around the water cavity 110 in the first air chamber 101. The SPA pool 100 further includes a connecting assembly including first connecting assemblies 411 which provide fluid communication between the water inlet pipeline 41 and the first nozzle assembly 30. The first connecting assemblies 411 are arranged in the first air chamber 101 and fluidly communicate with the first nozzle assembly 30. It should be understood that the positions and quantity of the first connecting assemblies 411 correspond to those of the first nozzle assemblies 30. Optionally, the fluid pipeline 40 further includes air inlet pipelines 42. One end of an air inlet pipeline 42 is connected to a first connecting assembly 411, and the other end thereof is connected to an opening on the outer wall 122 of the pool wall 12 and communicates with the outside, so that the first connecting assembly 411 is in fluid communication with an external space through the air inlet pipeline 42. Notably, the first connecting assemblies 411 are attached to the inner wall 121 of the pool wall 12 and are in fluid communication with the first nozzle assembly 30.

Optionally, the first nozzle assembly 30 may be connected to the first connecting assembly 411 through a pipe with an adjustable length, and whether the pipe is of a fixed length or an adjustable length, the pipe can be integrally provided with the first nozzle assembly 30 or may be provided separately. In addition, a first nozzle assembly 30 and a first connecting assembly 411 are optionally connected with each other in a rapidly detachable manner via a pipe.

It should be understood that the air inlet pipeline 42 is an optional configuration. By means of the air inlet pipeline 42, when water flows to the first nozzle assemblies 30 through the water inlet pipeline 41 via the first connecting assemblies 411, air external to the pool body 10 is sucked into the first connecting assemblies 411 and mixed with the water flow in the first connecting assemblies 411. Jets of a water and air mixture may be ejected through the first nozzle assemblies 30, the jets having an enhanced massage effect as compared with that provided by a water flow unmixed with air.

According to one or more example embodiments, referring to FIG. 5 and FIG. 6, the SPA pool 100 may include at least one second nozzle assembly 50 having one end thereof in fluid communication with the water cavity 110. The connecting assembly of the SPA pool 100 my further include a second connecting assembly 412 arranged in the first air chamber 101 and in fluid communication with the other end of the second nozzle assembly 50. Optionally, the second nozzle assembly 50 may have a flow control valve, which is used to adjust the flow rate of a jet flowing out of the second nozzle assembly 50, so as to correspondingly adjust the massage intensity. For example, in a case in which a stool 23 is provided, the second nozzle assembly 50 may be arranged at a position of the pool wall 12 above the stool 23, thereby providing personalized massage intensity for a user using the stool. For the second connecting assembly 412, the air inlet pipeline 42 is also an optional configuration.

According to one or more example embodiments, as illustrated in FIG. 3, FIG. 6, FIG. 7 and FIG. 9, the pool bottom 11 may be provided with a first wave-making unit 51, and the surface of an inflatable seat, such as the inflatable lounge chair 22, may be provided with a second wave-making unit 52, wherein the first wave-making unit 51 and the second wave-making unit 52 are provided with holes in fluid communication with the water cavity 110, and spaces in the first wave-making unit 51 and the second wave-making unit 52 are in fluid communication with the water cavity 110 via the holes.

The SPA pool 100 may be provided with an interface assembly 70, and the interface assembly 70 is used to connect to an external pump system (including a water pump assembly and an air pump assembly). The pump assemblies are used for supplying water to the fluid pipeline 40, the first nozzle assembly 30 and the second nozzle assembly 50, and for supplying air to the first wave-making unit 51 and the second wave-making unit 52. For example, the water pump assembly in the pump system pumps water from the water cavity 110, and the pumped water is pressurized and supplied to the fluid pipeline 40, thus forming water circulation; and the air pump assembly sucks air from the outside atmosphere, and the sucked air is pressurized and supplied to the first wave-making unit 51 and the second wave-making unit 52. The gas (e.g., air) supplied to the first wave-making unit 51 and the second wave-making unit 52 enters the water cavity 110 through the holes provided thereon to form bubbles. Optionally, a filter device is provided on a path of the water circulation (for example, on a water suction side of the interface assembly 70 or in the pump system), and the filter device can circularly filter the water in the water cavity 110.

Optionally, the first wave-making unit 51 or the second wave-making unit 52 may include a wave-making zone and/or a wave-making pad (or a wave-making patch). With respect to the example embodiment shown in FIG. 6, the first wave-making unit 51 includes a wave-making channel that forms the wave-making zone. The wave-making channel is arranged as a closed loop, and at least a part of the wave-making channel is distributed along the periphery of the inflatable seat. For example, as illustrated in FIG. 4, the wave-making channel is arranged in an irregular ring shape, the outer contour of the ring shape is complementary to the outer contour of the space occupied by the inflatable seat chair 21 and the inflatable lounge chair 22 at the pool bottom 11, so as to provide a wave-making massage effect for the space where backrest massage is not provided, and the inflatable stool 23 is optionally arranged in the annular space of the wave-making channel.

Optionally, the first wave-making unit 51 is in fluid communication with the second wave-making unit 52.

As illustrated in FIGS. 6 and 9, the inflatable lounge chair 22 further includes the leg support 2021, as described above, and at least a part of the second wave-making unit 52 is located at or adjacent to the leg support 2021 to massage the legs or feet of the user. Specifically, the inflatable lounge chair 22 may further include a wave-making patch 226, and the periphery of the wave-making patch 226 is connected to the top sheet 224 so that an air inlet space is formed between the wave-making patch 226 and the top sheet 224. The wave-making patch 226 is provided with holes enabling the air inlet space to be in gas communication with the water cavity 110. One end of the air inlet assembly 60 is connected to the top sheet 224 and the other end thereof is connected to the confining sheet 223. As illustrated in FIG. 9, the top sheet 224 and the confining sheet 223 are respectively provided with a first connecting hole 2241 and a second connecting hole 2231 corresponding to the air inlet assembly 60, and both ends of the air inlet assembly 60 are respectively sealed with the first connecting hole 2241 and the second connecting hole 2231. As illustrated in FIG. 6, the air inlet assembly 60 is in gas communication with the first wave-making unit 51 through a vent pipe 61, so that the pressurized air entering the first wave-making unit 51 is guided into the air inlet space formed by the wave-making patch 226, through the vent pipe 61 and the air inlet assembly 60, in sequence, and finally enters the water in the water cavity 110 through the holes on the wave-making patch 226, forming bubbles for massage.

According to one or more example embodiments, the nozzle assemblies may be arranged on the inflatable seat. Furthermore, in addition to the backrest massage function, an inflatable seat according to one or more example embodiments may also provide a leg or foot massage function.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A spa pool comprising:
- a bottom wall;
- an inner wall;
- a water cavity defined by the bottom wall and the inner wall;
- a first air chamber defined by the bottom wall and the inner wall;
- an inflatable seat disposed in the water cavity and defining a second air chamber;
- a first nozzle assembly including a first end and a second end, the first nozzle assembly at least partially accommodated in the second air chamber; and
- a fluid pipeline at least partially disposed in the first air chamber and in fluid communication with the second end of the first nozzle assembly;
- wherein the first end of the first nozzle assembly is in fluid communication with the water cavity.

2. The spa pool according to claim 1, wherein the inflatable seat comprises a backrest, and the first nozzle assembly is at least partially disposed in the backrest.

3. The spa pool according to claim 2, wherein the inflatable seat further comprises:
- a bearing part fixed to the bottom wall, wherein the bearing part and the backrest jointly define the second air chamber.

4. The spa pool according to claim 3, wherein the inflatable seat further comprises a tensioning belt assembly connecting the backrest and the bottom wall.

5. The spa pool according to claim 1, further comprising:
- bubble unit disposed on a surface of the inflatable seat, the bubble unit comprising an air cavity and a plurality of holes, the air cavity in the bubble unit fluid communication with the water cavity through the plurality of holes.

6. The spa pool according to claim 1, wherein:

the fluid pipeline comprises a water inlet pipeline disposed in the first air chamber;

wherein the spa pool further comprises a first connecting assembly at least partially disposed in the first air chamber and is in fluid communication with the first nozzle assembly.

7. The spa pool according to claim 6, wherein the fluid pipeline further comprises an air inlet pipeline comprising a first end connected to the first connecting assembly, and a second end disposed on the inner wall, the first connecting assembly fluidly communicating with a space external to the spa pool through the air inlet pipeline.

8. The spa pool according to claim 6, further comprising:

a second nozzle assembly including a first end in fluid communication with the water cavity and a second end in fluid communication with the fluid pipeline, the second nozzle assembly at least partially accommodated in the first air chamber.

9. A spa pool comprising:

a side wall defining a water cavity;

an inflatable seat disposed in the water cavity and defining an air chamber, the inflatable seat having a first side and a second side;

a nozzle assembly extending through the air chamber from the first side of the inflatable seat to the second side of the inflatable seat; and a fluid pipeline at least partially disposed in the side wall and in fluid communication with the nozzle assembly.

10. The spa pool according to claim 9, further comprising:

a bubble unit disposed in the water cavity and defining an air cavity and a plurality of holes, the air cavity in the bubble unit in fluid communication with the water cavity through the plurality of holes.

11. The spa pool according to claim 10, wherein the bubble unit is disposed on a surface of the inflatable seat.

12. The spa pool according to claim 1, wherein the inflatable seat comprises:

a top wall and a bottom wall together defining the second inflatable chamber;

a sleeve comprising a first end hermetically coupled to the top wall of the inflatable seat and a second end hermetically coupled to the bottom wall of the inflatable seat;

wherein the first nozzle assembly extends through the sleeve.

13. The spa pool according to claim 12, wherein the top wall of the inflatable seat comprises a through hole;

wherein the first nozzle assembly comprises a nozzle coupled to the through hole of the inflatable seat.

14. The spa pool according to claim 6, wherein the first nozzle assembly comprises a nozzle and a pipe, the nozzle of the first nozzle assembly fluidly communicating with the first connecting assembly through the pipe of the first nozzle assembly.

15. The spa pool according to claim 14, wherein the inflatable seat comprises a top wall and a bottom wall together defining the second inflatable chamber;

wherein the pipe of the first nozzle assembly penetrates the bottom wall of the inflatable seat.

* * * * *